(12) United States Patent
Just

(10) Patent No.: US 6,318,022 B1
(45) Date of Patent: Nov. 20, 2001

(54) METHOD OF FORMING A LINER FOR A PLANT CONTAINER

(75) Inventor: Perry Just, Westland (NZ)

(73) Assignees: The Christian Church Community Trust, Westland; Discoveries in Gardening-Moss Products Limited, Hamilton, both of (NZ)

(*) Notice: Subject to any disclaimer, the term of this patent is extended or adjusted under 35 U.S.C. 154(b) by 0 days.

(21) Appl. No.: 09/372,291

(22) Filed: Aug. 11, 1999

(30) Foreign Application Priority Data

Jun. 15, 1999 (NZ) ............................................ 336300

(51) Int. Cl.[7] ........................... A01B 79/00; A01B 79/02; A01C 1/00; A01G 1/00; A01H 3/00
(52) U.S. Cl. ............................................ 47/58.1; 47/66.7
(58) Field of Search ............................ 47/66.7, 81, 72, 47/67, 73, 75, 58.1; 53/461; D11/164, 148

(56) References Cited

U.S. PATENT DOCUMENTS

| | | | |
|---|---|---|---|
| 2,848,842 | * 8/1958 | Tennant | 47/58.1 |
| 3,187,463 | * 6/1965 | McCollough et al. | 47/58.1 |
| 3,818,633 | 6/1974 | Sable | 41/1.2 |
| 3,958,365 | * 5/1976 | Proctor | 47/58.1 |
| 5,018,300 | 5/1991 | Chiu et al. | 41/67 |
| 5,171,390 | 12/1992 | Travers | 156/212 |
| 5,363,592 | * 11/1994 | Weder et al. | 47/58 |
| 5,454,191 | 10/1995 | Mayeda et al. | 47/66 |

FOREIGN PATENT DOCUMENTS

| | | |
|---|---|---|
| 711582 | 4/1998 | (AU) . |
| 60637/98 | 10/1998 | (AU) . |
| 1790/98 | 2/1999 | (CL) . |
| 2 288 307 A | 10/1995 | (GB) . |
| 299234 | 2/1998 | (NZ) . |
| 314613 | 10/1998 | (NZ) . |
| 314825 | 10/1998 | (NZ) . |

* cited by examiner

Primary Examiner—Charles T. Jordan
Assistant Examiner—Judith A. Nelson
(74) Attorney, Agent, or Firm—Workman, Nydegger & Seeley

(57) ABSTRACT

A liner (11, 20, 27, 30) for a plant container is formed by firstly compressing sphagnum moss into a thin but reconstitutable sheet. The sheet may be then assembled into a three dimensional liner for insertion into the plant container and secured in that configuration. The formed three dimensional liner has one or more walls (2, 13, 21, 36, 38) extending in an upstanding configuration to generally conform to the shape of the plant container. The wall(s) are self-supporting in the upstanding configuration. In a preferred embodiment, an outer surface of at least a portion of the liner (11, 20, 27, 30) may be partially reconstituted.

32 Claims, 14 Drawing Sheets

FIG. 10
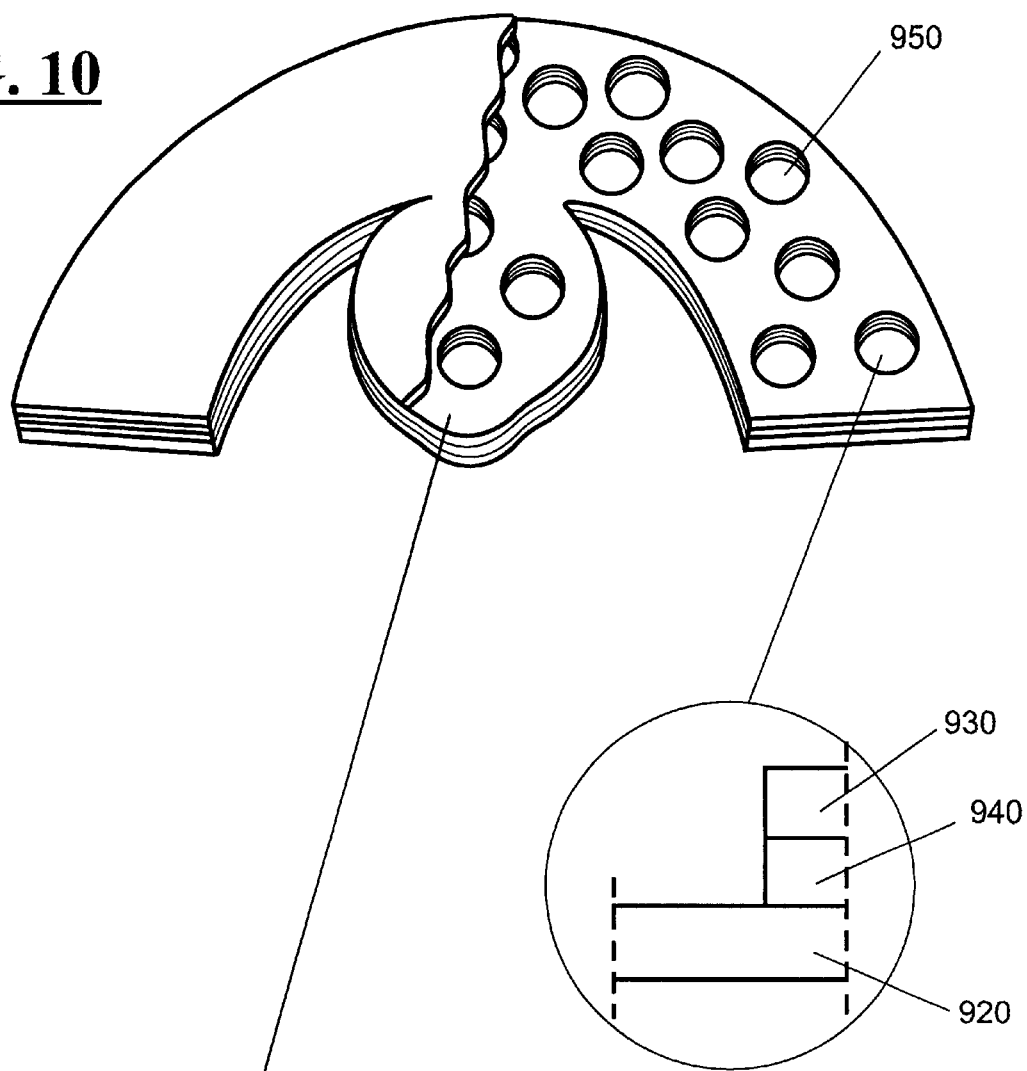
FIG. 11
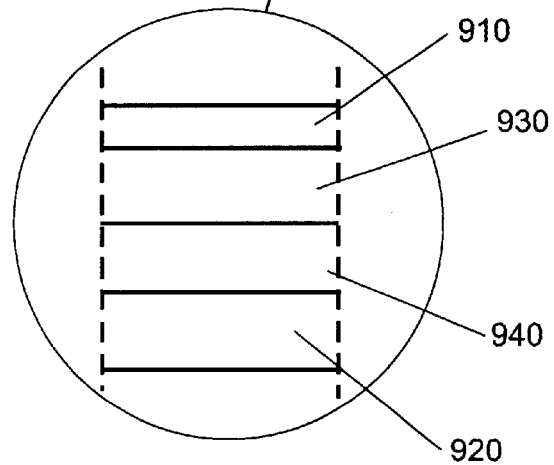
FIG. 12

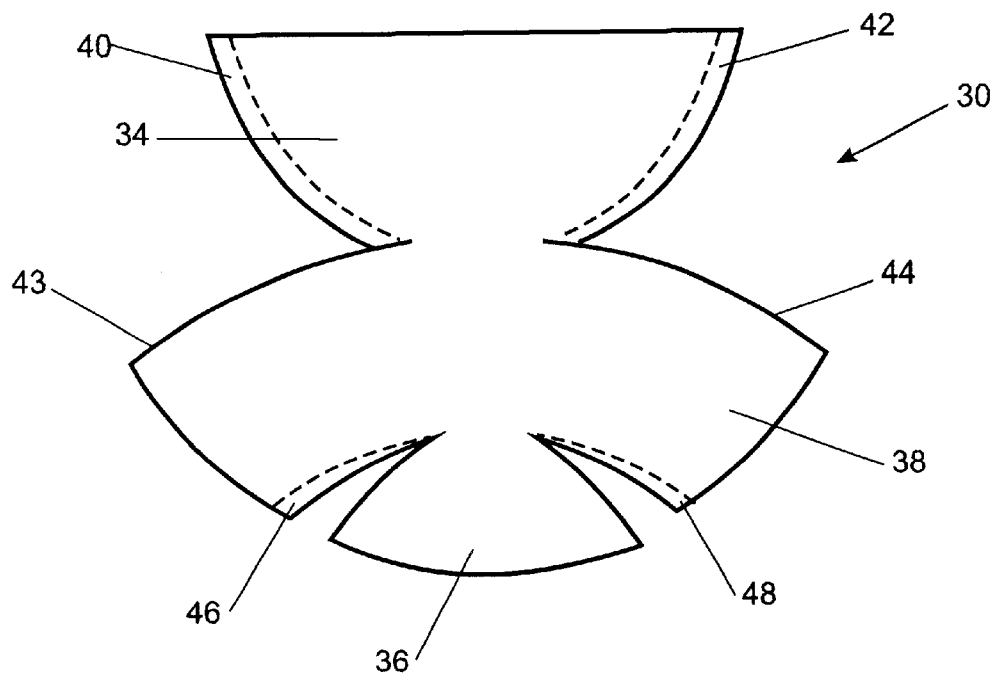
FIG. 26
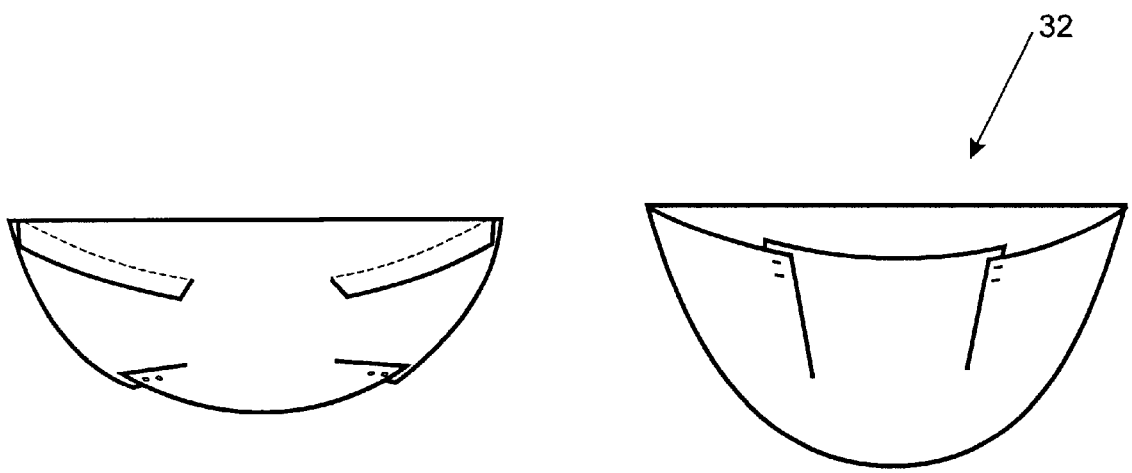
FIG. 27
FIG. 28

METHOD OF FORMING A LINER FOR A PLANT CONTAINER

FIELD OF THE INVENTION

This invention relates to a method of manufacturing plant container liners. In particular, although not exclusively, the invention relates to a method of forming sphagnum moss liners for hanging baskets, especially those baskets in the form of skeletal containers.

BACKGROUND OF THE INVENTION

Because of its unique water retaining properties, and pleasant appearance as a natural plant substance, sphagnum moss has traditionally been a favoured material for use in conjunction with floral arrangements and related horticultural activities.

Traditionally, sphagnum moss has been sold mostly in a dried state but sometimes in a wet state, but generally in a natural loose form in which each filament of the moss plant is separate and distinguishable.

In recent decades, a new technology has developed in the sphagnum moss industry. This is the use of pressure to compress the loose moss in a press into compact sheet form. These sheets are of various thickness, usually from 2 or 3 mm to about 7 mm. They are somewhat like cardboard in flexibility and look somewhat like particle board in texture.

In its traditional loose form, sphagnum moss has always been associated with hanging baskets. One reason for this is its particular ability to absorb and retain water up to and exceeding 20 times its own weight. Another is its natural and aesthetically pleasing appearance.

The most common traditional method of using sphagnum moss to line hanging baskets is to place some loose moss in the bottom of a wire hanging basket then cover the moss with a little potting mix. After this the basket is gradually filled, firstly by building up the outer layer of sphagnum moss around the outside of the basket and secondly by holding it in place with a little more soil and potting mix. This process is repeated several times until the lining of sphagnum moss reaches right to the upper rim of the hanging basket.

This is obviously a very labour intensive task. For this reason it has mostly been performed at home by the enthusiastic gardener, and by staff in some garden centres. In this form, hanging baskets with a layer of sphagnum moss directly inside the wire basket can be made available only when they are filled with soil and potting mix, because it is the soil and potting mix which holds the outer lining of loose filaments of moss in place.

It is evident that there is an extremely limited scope for selling sphagnum moss lined hanging baskets in this form. The labour content in filling them is very high. In addition the basket would need to be regularly watered to keep the potting mix and the sphagnum moss moist.

For these reasons, sphagnum lined hanging baskets filled in this way would normally have to be made and sold in the same garden centre. Such articles could not be manufactured on a large scale using technology and production machinery and then transported in bulk nationally and internationally to many retail outlets. Consequently only very small numbers of such sphagnum lined baskets are made up in this way.

One company in USA has taken a step forward in this regard and created a sphagnum moss lined hanging basket which can much more readily be transported in cartons as freight, or even posted in the mail, which makes them much more marketable than the previously mentioned type. In these, filaments of loose dry sphagnum moss are fixed onto the outside of the basket with very fine filament or wire. This means that no soil or potting mix is needed to hold the sphagnum moss in place.

However, the process of sewing the filaments or moss onto the outside of the basket is very time consuming and keeps this type of moss lining within the category of a hand crafted item. As such, this type of liner will always be relatively expensive, limited in numbers, and therefore a speciality item.

In very recent years two New Zealand firms have marketed hanging basket liners made from compacted sphagnum moss.

One company markets a product shaped like a Maltese cross. When placed inside a hanging basket, the edges fold up and contour to the shape of the basket. The other company produces a number of small flat shapes which when placed inside a hanging basket, also conform to its shape and become a sphagnum moss liner.

Common features of the two New Zealand compact sphagnum liners presently on the market are:

1 They are both presented to the public in flat, one dimensional form.
2 Both must be placed inside a hanging basket before they can assume and retain the three dimensional shape of the basket.
3 Both are in untreated compacted sheet form and bear little resemblance to sphagnum moss.
4 Both have to be assembled by the purchaser according to instructions supplied.

Extensive market research conducted on our behalf concerning basket liners made up of flat sections of compacted sphagnum moss shows that unless there has been a considerable amount of prior instruction and education, a large proportion of the general public and the gardening public are not aware that:

such flat shaped pieces of compacted sphagnum moss are in fact basket liners;
such a smooth surfaced, cardboard-like substance is in fact sphagnum moss.

In addition, the public needs instruction as to how such objects should be assembled into their end form as basket liners.

Consequently, expensive and extensive advertising and promotional material, and special training of shop sales persons at every point of sale has been necessary to combat the fact that many people do not know:

what such objects are and what they are for
what they are made of
how they are to be assembled In spite of all this instruction, which does increase the price unnecessarily, many people still pass them by because they do not know what they are, and do not realise how they make up into a basket liner.

As a result, these liners have been observed in sales outlets being progressively moved into obscure positions of display where they gather dust.

It is an object of the present invention to provide a method of manufacturing a plant container liner which will address at least some of the foregoing problems or at least provide the public with a useful choice over liners at present available.

SUMMARY OF THE INVENTION

According to an aspect of the present invention there is provided a method of forming a liner for a plant container, the liner being of three dimensional form having one or more walls extending in an upstanding configuration, the method including: compressing sphagnum moss into a thin, reconstitutable sheet; processing the sheet to a three dimensional form; and securing the sheet in that form, whereby the formed liner is such that the wall(s) of the liner are self-supporting in the upstanding configuration.

The sphagnum moss may be compressed into individual sheets (in the form of blanks), each for folding into an individual liner. An appropriately shaped mould may be used to form each of the blanks. Mould loading devices may be utilised to load a predetermined quantity of moss into the recesses of the moulds.

Alternatively, the sphagnum moss may be compressed into the form of a larger sheet so that a number of blanks may be cut from the sheet and each blank folded to form the three dimensional liner. Suitably each blank is secured in the three dimensional form by the use of fasteners such as staples. However glueing and sewing is also possible.

Each blank is generally of a form including a base section and one or more wall sections, preferably a single arcuate wall section extending around a circular base. In one form of such a blank the base section may be integrally formed with the wall section along a part of the periphery of the base, allowing the remainder of the wall section to be folded about the remainder of periphery of the base. The blank is secured in the three dimensional form by overlapping extension areas of the base and/or the wall section and joining together the ends of the wall section by fastening means such as staples passing through the overlapped sections. Where the blank is made directly in the aforementioned shape by the use of a mould, the outline of the recess of the mould suitably defines this shape.

The liner may also be formed having a separate base blank with a lip section foldable upwardly, and a wall section blank. The two blank pieces may be assembled by overlapping the lower edge of the wall with the base lip and overlapping and joining the ends of the wall using suitable fastening means such as staples.

The moss which is compacted into sheets is preferably pre-dried to around 18 to 20 percent moisture by weight. In a preferred form of the invention, the moss is compressed without any additional heat being applied. However, in countries (eg Australia) excluding the import of any moss other than that which is certifiably free of viable seed, the moisture of the content of the sphagnum moss prior to the compaction may be greater to generate steam during hot-pressing to generate steam to sterilise the moss. See for example New Zealand Patent Specification 314613/314825, Australian Patent Specification 6037/98 or Chile Patent Specification 1790-98, However, where possible, the cold-press method is preferred because it is believed that hot-pressing slows the rate at which the compressed sphagnum moss can be reconstituted.

The invention of assembling this compressed plant liner in a three dimensional form in our factory, (ie remote from the point of retail sale) so that it can be transported and presented in the market in this manner, makes possible the further advantage that the manufacturer can also at least partially reconstitute the surface of at least a portion of the liner, preferably by spraying the outer surface with a suitable quantity of fine water spray so that the outer surface swells up to such measure that it appears to any uninformed person as in fact being made of sphagnum moss. It is anticipated that a liner in this form will have a very instant and widespread appeal. However, the invention is not limited to partial reconstitution being performed in our factory. This step may be effected at a point of retail sale.

The degree of reconstitution of the outer surface should necessarily be limited, lest the liner soak up too much water, thereby losing their self-supporting quality and become bulky and heavy. The quantity of water for an average sized liner would be between 10 and 15 ml.

The partial reconstitution may be effected prior to or after assembling the blank to the three dimensional form. This may be achieved by spraying the liner with a suitable liquid such as water. The liquid might be coloured (eg green) to contribute a pleasing aesthetic effect to the liner. Where the liner has a base and upstanding walls, the partial reconstitution is preferably effected on the exterior of the walls. In a most preferred form of the invention, the partial reconstitution is effected to the whole exterior of the liner.

The present invention can attain some additional advantages by using a water retentive barrier within the sphagnum moss sheet. Any suitable water retentive barrier can be incorporated and it is desirable for the water retentive barrier to be disposed towards the exterior of the three dimensional liner. This will assist with the partial reconstitution. If water is sprayed onto the exterior of the three dimensional liner, then only the sphagnum moss in an outer surface layer at the exterior of the liner will reconstitute leaving the greater thickness of compressed sphagnum moss on the inside of the water retentive barrier unaffected by any moisture used for the reconstitution of the outer surface.

One form of the water retentive barrier is aluminium foil. In this case a thin outer layer of compressed sphagnum moss will be attached to the aluminium foil at the exterior of the completed liner and a thicker layer of compressed sphagnum moss is attached to the inner side of the aluminium foil. In the method of manufacture, the layer of aluminium foil would be placed upon a prelaid bed of sphagnum moss and a second layer of sphagnum moss placed on the foil prior to compaction. The adhesion between the sphagnum moss and foil can be created using a suitable adhesive coated onto the foil but the invention is intended to encompass any suitable means of creating a bond between the foil and the sphagnum moss.

It should also be understood that while aluminium foil is described in this specification, any suitable means of creating the water barrier is within the ambit of the invention. However, for the reason of ensuring the liner has satisfactory visual appearance there is most desirably, a reconstitutable surface layer of moss at the exterior of the liner.

It may be possible to create a mechanical bond between the foil and the sphagnum moss as a consequence of deformation of the foil in association with the sphagnum moss during compression or by using a special form of foil which has surface characteristics that will enhance mechanical bonding.

For transportation it is clearly desirable to ensure that the three dimensional form of the liners are able to be nested one within the other to minimise the transportation space required in sending the liners to the point of retail sales.

The present invention provides a method of manufacture for a plant liner which will ensure that at the point of sale, the purchaser is able to readily recognise that the three dimensional liner is formed as a compressed sphagnum moss liner.

The invention consists in the foregoing and also envisages construction of which the following give examples only.

BRIEF DESCRIPTION OF THE DRAWINGS

One preferred form of the invention and modifications thereof will now be described with reference to the accompanying drawings in which:

FIG. 10 is a perspective/partial cross-sectional view of the positive mould member shown in FIG. 9;

FIG. 11 is a cross-sectional detail of the positive mould member illustrated in FIG. 10;

FIG. 12 is a cross-sectional detail of the positive mould member illustrated in FIG. 10;

FIG. 26 is a view of a blank for a compressed sphagnum moss liner according to another preferred embodiment of the invention;

FIG. 27 is an inside view of the liner assembled from the blank of FIG. 26;

FIG. 28 is a front view of the liner of FIG. 27; and

PREFERRED EMBODIMENTS OF THE INVENTION

Figure 1:
FIG. 1 illustrates filaments of natural sphagnum moss product as harvested.

FIG. 1 shows filaments of harvested sphagnum moss 100. The sphagnum moss 100 is used primarily in the present invention for its water retentive property which is up to 20 times its own weight in water. The sphagnum moss 100 is also used for its aesthetic value in hanging basket arrangements. The sphagnum moss is harvested from a natural and renewable source.

Initially, some of the excess water may be removed from the freshly harvested sphagnum moss 100 through the use of a centrifuge or calender rolls. The sphagnum moss 100 is then dried either in a kiln or with natural sunlight. Preferably, the sphagnum moss 100 is dried in a kiln with a continuous conveyor (not shown), the speed of which is controllable. Suitably, an automatic feeding system (not shown) that deposits the moss onto the kiln's continuous conveyor is also provided. The kiln is in the form of a tunnel and operates to circulate heated air which is generated from hot water heat exchangers operating at a temperature as high as 140° C. The moss is gradually dried as it travels through the kiln.

After drying, the moss may be left in piles to cool and reabsorb some moisture from the atmosphere. Alternatively, additional moisture may be added to the moss through the use of pressurised water misting nozzles. The optimum moisture content of the moss prior to pressing is 18 to 20 percent by weight although a range of 14 to 17 percent by weight is commonly used. It is considered that anything in the range of 3 to 25 percent by weight will work.

Figure 2:
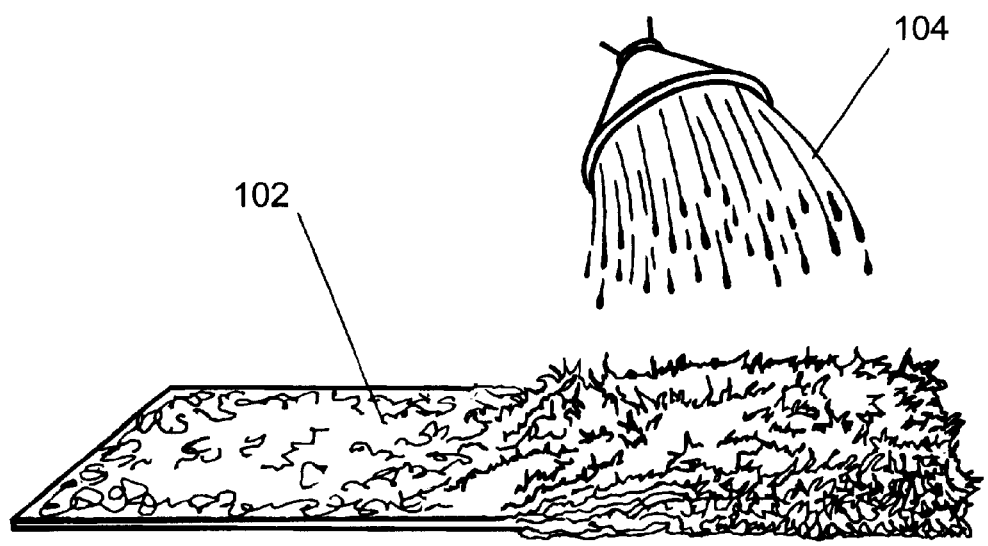
FIG. 2 illustrates the principle of reconstitution of a sheet of compressed sphagnum moss.
Figure 9:
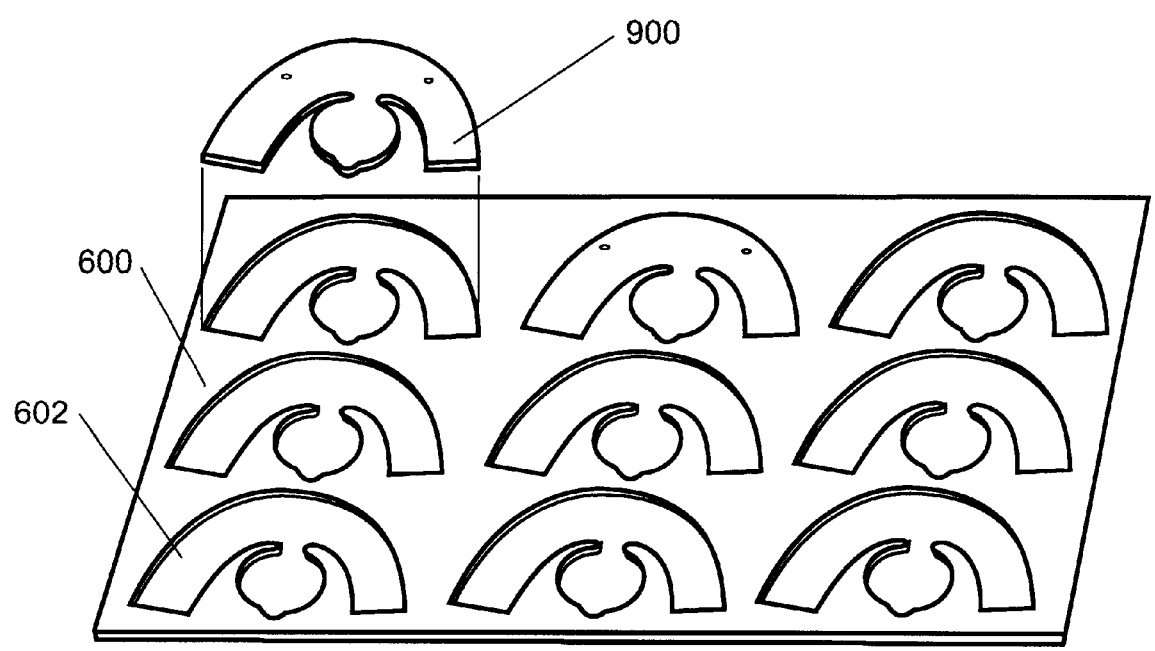
FIG. 9 is a perspective view of the negative mould plate of FIG. 6 illustrating the alignment of a cooperable positive mould member.

When an appropriate moisture content has been reached, the sphagnum moss can be compressed into sheets 102 as illustrated in FIG. 2. The sphagnum moss sheet 102 has the ability to absorb a significant quantity of water 104 and reconstitute into its substantially original state. The sheet 102 illustrated in FIG. 2 is included to provide the reader with an appreciation of the ability of sphagnum moss to reconstitute from a compressed, substantially dried state to its substantially original state. Prior to reconstitution, the sheet 102 may be cut into one or more blanks, each of which may then be assembled to form a three dimensional liner. However, in the most preferred form of the invention to be explained by the following text, the sphagnum moss is compressed directly into the form of individual blanks each of which, when assembled forms a three dimensional liner of the form illustrated in FIG. 15. FIG. 9 illustrates the general form of the mould used to form each of the blanks. The mould includes a negative mould plate 600 having a number of mould recesses 602 and positive mould members of a shape complimentary to that of the recesses. Accordingly, a mould loading device 300 (FIG. 3) is used to load sphagnum moss into the mould recesses 602.

Figure 3:
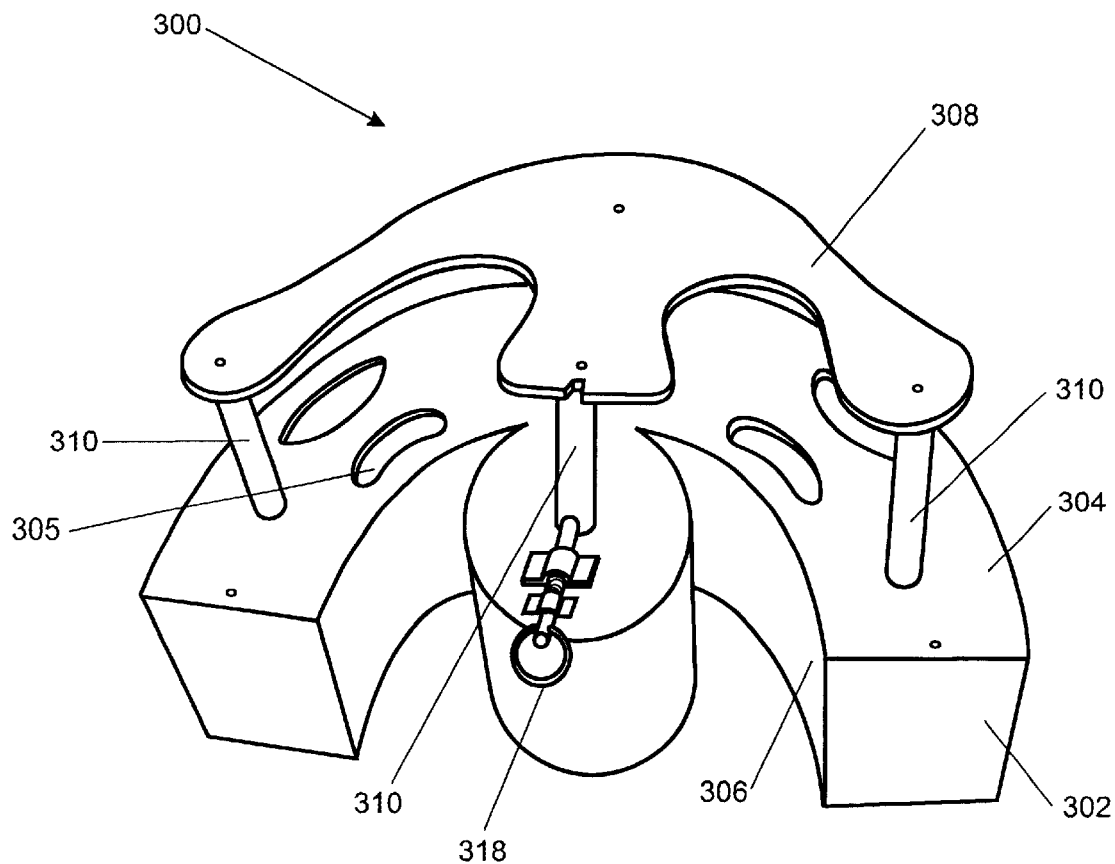
FIG. 3 is a bottom perspective view of a mould loading device according to a preferred embodiment of the present invention.
Figure 4:
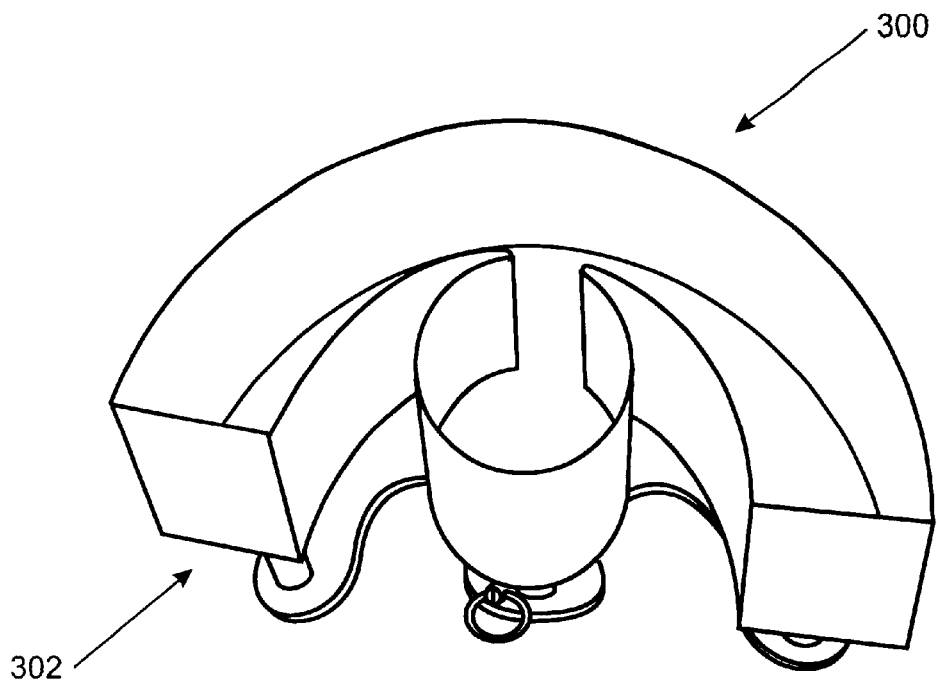
FIG. 4 is a top perspective view of the mould loading device illustrated in FIG. 3.

The mould loading device 300 comprises a filling box 302 generally conforming to the shape of the mould recess 602 to be filled. The filling box 302 shown in FIG. 3 includes a base 304 and side walls 306 but is open at the top as illustrated in FIG. 4. The base 304 includes finger slots, the reason for which will be explained.

Figure 5:
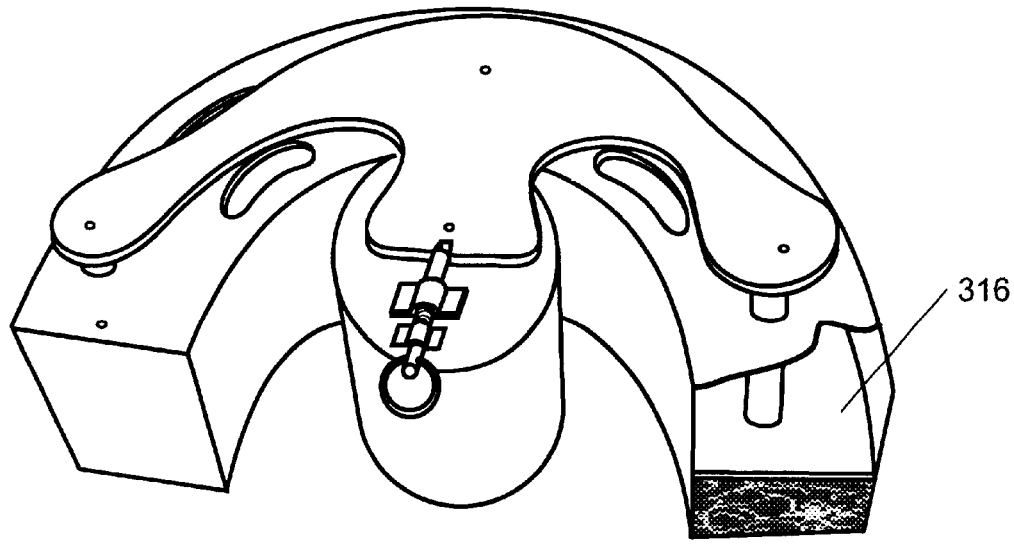
FIG. 5 is a bottom perspective view with the mould loading device in operation.

The mould loading device 300 further includes a handle portion 308 conforming only approximately to the shape of the filling box 302. Dependent from the handle portion 308 are four dowels 310 (only three of which are shown). These dowels 310 are fixed to the handle portion 308 at spaced locations but extend slidingly through apertures provided in the base 304 of the filling box 302. As can be seen in FIG. 5, the dowels 310 are attached to a false bottom 316 which is complimentary in shape to the base of the filling box. The false bottom 316 is slidable within the filling box 302 and is controlled by the handle portion. In FIG. 3, the handle portion has been pulled out as far as possible so that the false bottom 316 engages against the inside of base 304. In this configuration, the spring loaded latch 318 has a pin which extends into an aperture provided in centre dowel 310. This holds the false bottom 316 in position against the inside of base 304 during filling and tipping.

In use, the moss loading device is oriented in FIG. 4 with the handle portion 308 fully extended and the latch in position in the dowel 310. Sphagnum moss 100 is inserted into the open end of the filling box 302. Once filled, the mould loading device is weighed on electronic scales to ensure that an appropriate quantity of moss has been inserted into the filling box. Once filled to a satisfactory level, the mould loading device 300 is brought to the negative mould plate 600 (FIG. 6 or FIG. 9) and the loading device is deftly flipped over so that the opening is in register with the mould recesses 602 of the mould plate 600. To ensure adequate removal of the contents of the mould loading device 300, the latch 318 is released to allow the user to push handle portion 308 towards the base 304. The handle portion 308 is configured to enable the user to use both hands to extend around respective part of the handle portion 308 with the users fingers inserted through the finger slots 305. Squeezing together of the portion of the base between the finger slots 305 and the handle portion 308 ensures full ejection of the sphagnum moss 100 from the filling box 302 into the mould cavity 602. Depending on the size of the filling box 302 and the predetermined correct weight of the moss in the filling box, the thickness of the moss deposited into each mould recess will be approximately 60 to 85 mm.

Figure 6:
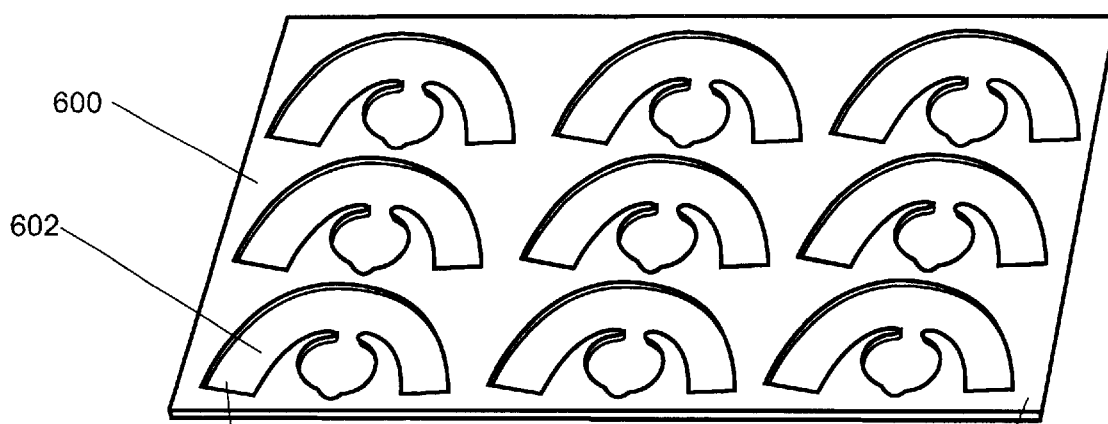
FIG. 6 is a perspective view of a negative mould plate.
Figure 7:
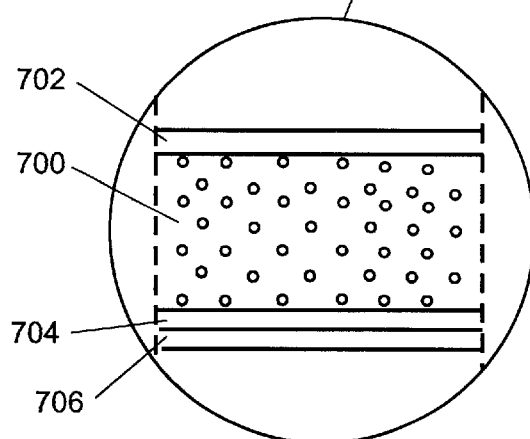
FIG. 7 is a cross-sectional detail of the negative mould plate illustrated in FIG. 6.
Figure 8:
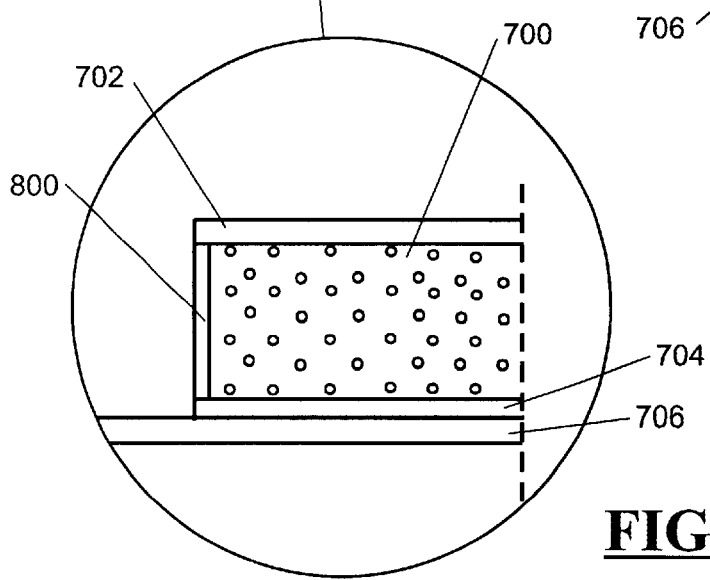
FIG. 8 is a cross-sectional detail of the mould plate illustrated in FIG. 6.
Figure 13:
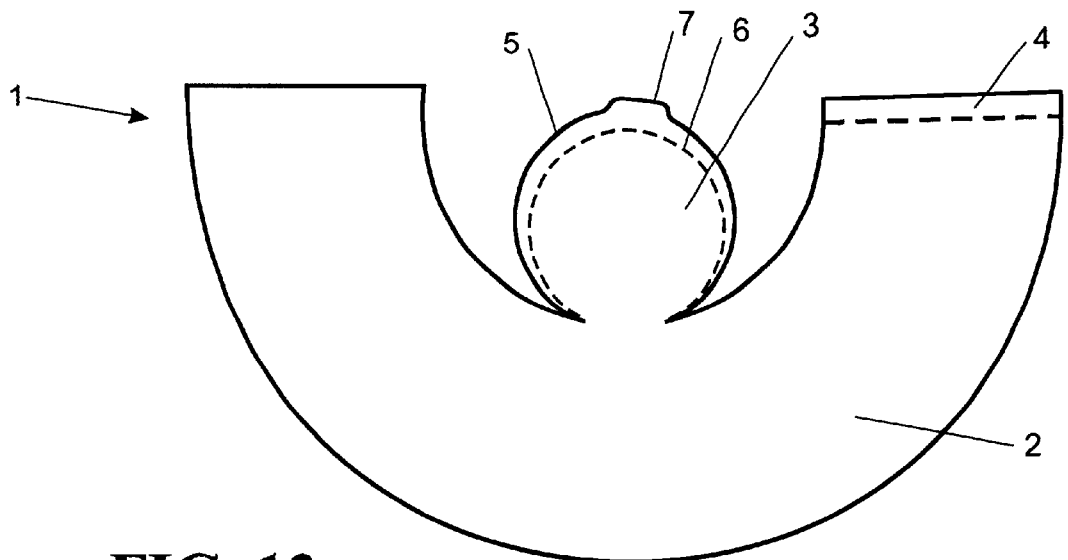
FIG. 13 is a blank of compressed sphagnum moss which may be used to assemble a plant container liner.
Figure 15:
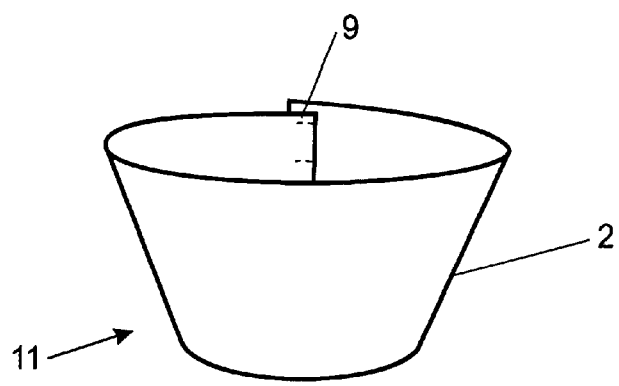
FIG. 15 is a side perspective view of the three dimensional liner shown in FIG. 14.

The negative mould plate 600 illustrated in FIG. 6 has a regular array of mould recesses 602 shaped so that the blanks produced thereby will conform to those illustrated in FIG. 13, to enable the assembly of the three dimensional liner illustrated in FIG. 15, with little if any wastage of sphagnum moss material.

The negative mould plate 600 is primarily constructed of a high density PVC foam material 700 sold under the trade mark KLEGECELL. The high density foam material 700 is sandwiched between two sheets of plywood 702, 704. The sheet 702 forms the upper surface of the mould and the sheet 704 defines the lower periphery of the high density foam material 700. A further sheet of plywood 706 is disposed to define the base of the negative mould plate 600.

The high density PVC foam material 700 is of the type commonly used in the construction of surfboards, sailboards and in general boat and yacht construction. Suitably the high density foam material should be both light and strong. The choice of plywood for the sheet 702, 704, 706 has been made because plywood is able to withstand the high pressures applied to it during the pressing process (500–3500 psi) (3.448–24.133 MPa).

All of the layers in the negative mould sheet 600, apart from the base layer 706 are cut to remove portions in the shape of the blanks to be formed by the mould recesses 602. Each of the layers 700, 702, 704 is provided with the cut outs in register with each other so that when the layers are stacked one on top of each other, the layers will define the mould recesses 602. Only the base layer of plywood 706 remains in tact and thereby defines the base of the mould recesses 602. The depth of the mould recesses can range between 35 and 90 mm depending on the application. The layers are glued together to form a laminate. The surface of the foam layer 700 defining the working surface of the mould recess 706 is provided with a fibreglass coating 800 to protect the working surface of the foam layer 700 from abrasion during pressing. The fibreglass coating 800 may include polyester, vinylester or epoxy resins and chop strand matt as is known to those skilled in the art of fibreglass.

The positive mould members 900 illustrated in FIGS. 9 to 12 are comprised of four sheets of plywood including a top sheet 910 of 7 mm plywood, a base sheet 920 of 12 mm plywood and two inner sheets 930, 940 of 12 mm plywood. The inner sheets of plywood 930, 940 are machined with a plurality of fairly evenly spaced apertures 950 which serves to reduce the weight of the positive mould member 900. The layers of plywood 910, 920, 930, 940 are glued together to form a laminate.

The shape of each positive mould member 900 is complimentary to the shape of each mould recess 602, except that the positive mould member 900 is smaller than the mould recess 602 so that a gap of between 2 and 3 mm is provided between the sides of the positive mould member 900 and the side wall of the mould recess 602 when the positive mould member 900 is inserted into the mould recess 602. Additionally, the positive mould members 900 are formed so as to be 5 to 10 mm thicker than the depth of the mould recesses 602. In this way, when the full pressure of the press bears on the positive moulds, no pressure will be exerted onto the top surface of the negative moulds. In view of the foam material, pressure on the negative mould plate 600 might cause it to be crushed.

In use, the mould recesses 602 of the negative mould plate 600 are filled in turn with sphagnum moss using the mould loading device 300. When all of the mould recesses 602 have been loaded with sphagnum moss, each of the positive moulds 900 is inserted into a respective mould recess 602. The assembly of the negative mould plates 600 and the positive mould members 900 is thus ready for insertion between the platens of a platen press (not shown). The press may be of a conventional type with the assembly of the mould plate 600 and mould members 900 being carried or conveyed to the press and inserted between the platens thereof, prior to the platens being brought together to compress the sphagnum moss within each of the mould recesses 602. The pressure for pressing the moss range is between 500 psi and 3800 psi (3.448–26.201 MPa) for a time ranging between 10 seconds and 3 minutes. The combination of pressure and time is such that the thickness of the blanks produced is between 2.5 and 4 mm and yet still able to reconstitute with the addition of water. This degree of compression provides the blank with sufficient rigidity to enable the walls of the assembled three dimensional liner to be self supporting. It is considered that a compressed thickness of between 1 mm and 6 mm for the stated precompression thickness of moss should also provide sufficient rigidity for the walls to be self-supporting.

In an alternative type press (not shown) the lower platen may be provided in the form of a table slidable into and out of the press. In this embodiment, the positive mould members are affixed to the upper platen of the press and the negative mould plate is affixed to the lower platen of the press. When the lower platen is moved into position inside the press, the mould recesses and the positive mould members are in precise alignment. With this arrangement, the negative mould plate 600 may be conveniently accessed for loading and unloading by sliding the table out of the press. In another alternative form of the press, the upper platen may be tiltable to provide increased access to the negative mould plate 600.

As illustrated in FIG. 13, the blank 1 which will be formed using the mould assembly of negative mould plate 600 and positive mould plate 900 has an arcuate wall section 2 and a circular base integrally formed with the wall section. An extension 4 at one end of the wall section 2 provides for an overlap to occur between the joining wall sections when folded about the base 3. Connecting staples 9 pass through the overlapped sections to retain the wall section of the liner assembled in the three dimensional form as illustrated in FIG. 14.

Figure 14:
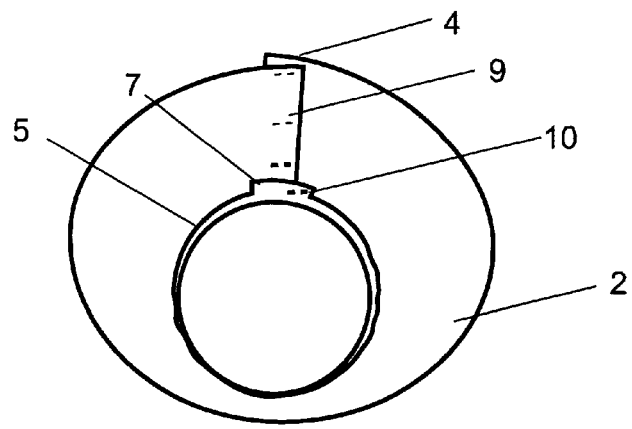
FIG. 14 is a top view of the three dimensional form of the liner assembled from the blank in FIG. 13.

The extension 5 beyond the perimeter of the base 3 indicated in dotted outline in FIG. 13 and the tab 7 can be folded up during assembly to overlap the lower periphery of the wall 2 and an attaching staple 10 passing through the tab 7 and wall will complete the assembly of the three dimensional liner 11 illustrated in FIGS. 14 and 15. The assembly method attaching the liner by use of stapling as explained above is simple and effective but the present invention is intended to encompass any means allowing the blank to be assembled into the desired three dimensional form and secured in place so that the liner is self-supporting.

Figure 16:
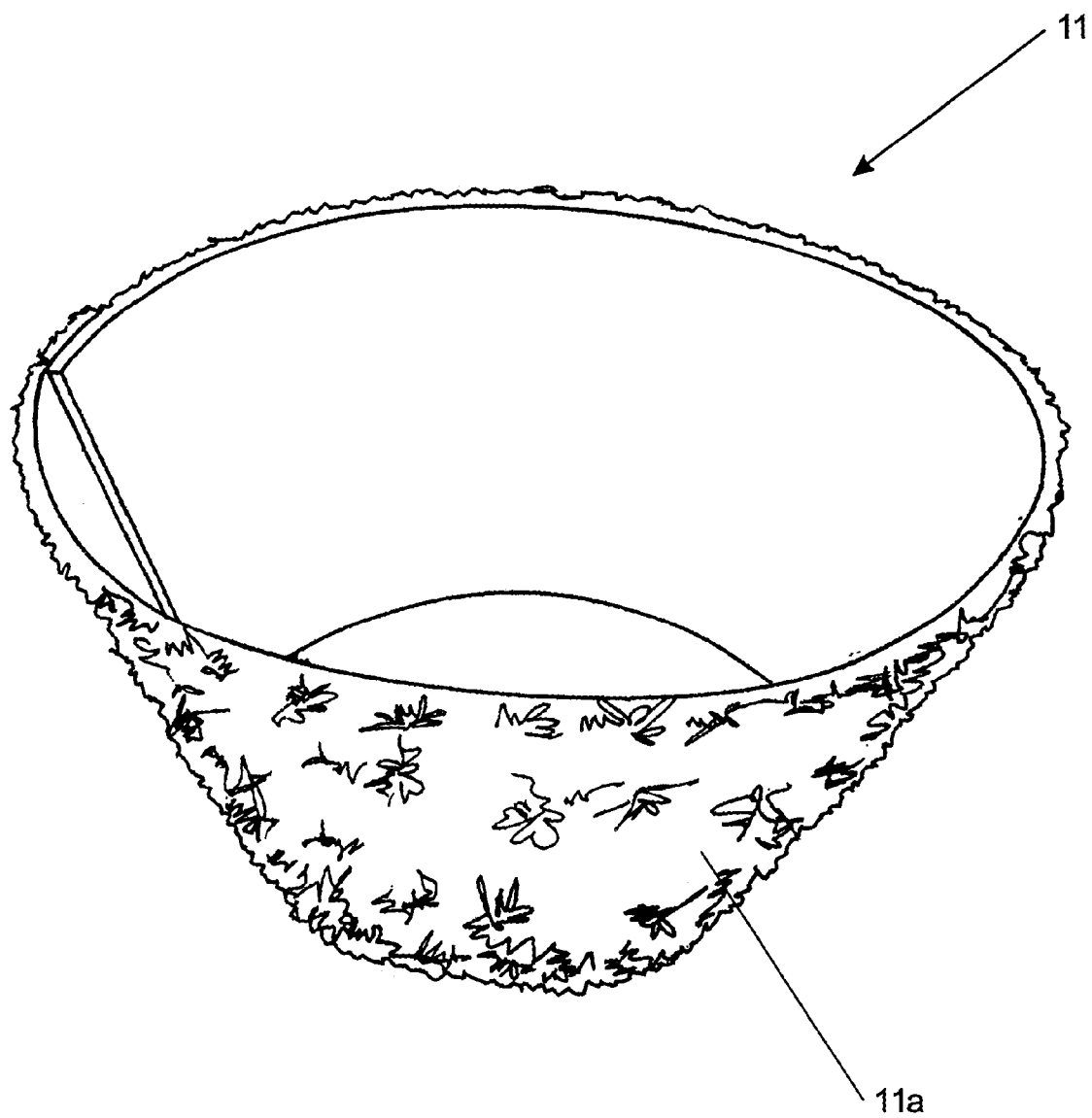
FIG. 16 is a perspective view of the three dimensional liner shown in FIG. 15 with the surface of the exterior of the liner partially reconstituted.

The compressed sphagnum moss liner 11 has the appearance of cardboard and consequently is not easily recognisable to the purchasing public as a sphagnum moss liner. To bring the surface of the sphagnum moss liners to resemble their original natural state, a fine mist of water is sprayed onto one side of the blank only, prior to assembly using a pressurised misting nozzle. This serves to at least partially reconstitute the surface layer of the blank 1 on one side. The blank 1 then passes through an air dryer in the form of a tunnel blowing a high volume of heated air to dry off any excess moisture. The blank 1 is then assembled into the three dimensional form of the liner 11 through the use of the connecting staples 9 in the manner illustrated m FIGS. 14 and 15. The assembled liner will resemble that illustrated in FIG. 16 with the surface layer 11a of the exterior of the blank 11 reconstituted as illustrated.

Following stapling, the liners 11 have appropriate product information and advertising sheets placed in or over the liners 11 in such a manner that they contour to the curved surfaces of the liners 11.

Figure 17:
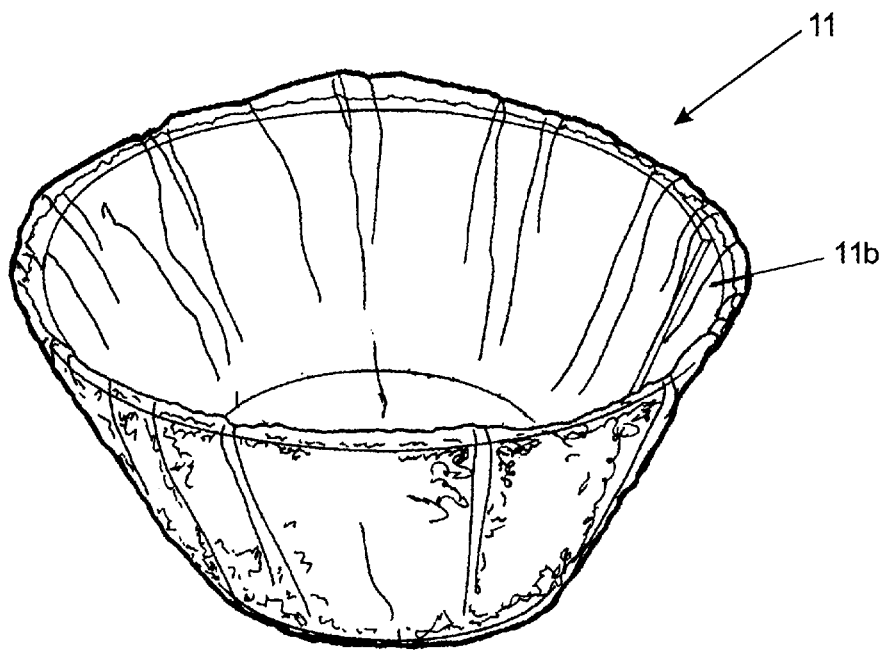
FIG. 17 illustrates the liner of FIG. 16 including a plastic shrink wrapping.
Figure 18:
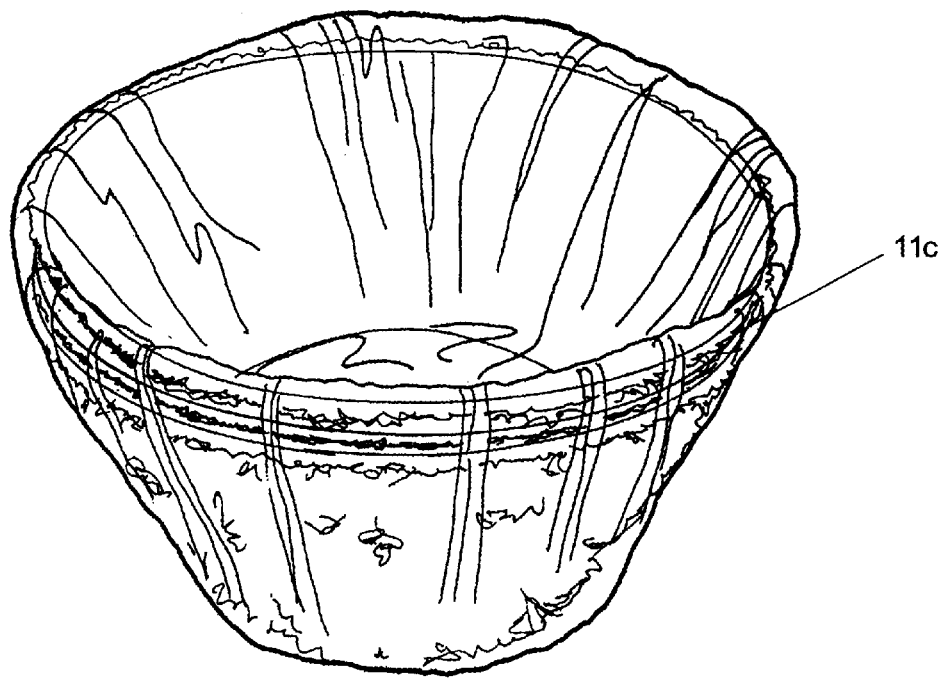
FIG. 18 is a perspective view of three liners, nested into a stack and bound by plastic shrink wrapping.

FIG. 17 illustrates the liner 11 enclosed within a bag 11b of shrink wrap plastic. The bag is sealed in a circular shape around the top of the liner 11, 10 to 100 mm from the top edge with a purpose built circular sealing machine. This provides a surplus of plastic which fits down inside the liner 11 against the sides and the bottom. The plastic is held in position against the sides and bottom of the liner 11 with a wire frame weighted with 1.5 kg of weights. The wire frame conforms to the inner contour of the liner 11. As the wire frame (not shown) is inserted into the liner 11, the plastic is held against the sides and bottom of the liner. Holes punched into the plastic prior to sealing enable air trapped inside the bag to escape when the wire frame is inserted into the liner. The liner 11 with the sealed bag and the weighted wire frame is passed through a shrink oven akin to a conveyor bread oven. The liner 11 and accompanying wrap is then allowed to cool, after which the weighted wire frame is removed. The result is that the plastic still lies snug against the interior and the bottom of the liner and not stretched tightly across the top of the liner 11 as would occur in conventional shrink wrapping.

The use of a circular bag with a circular sealer elimates bunching of the plastic on the outside of the liner which would occur with the use of a square bag. Additionally, with three liners nested together and shrink wrapped as a pack of three, the shrink wrapping process has the additional benefit of compacting the liners more tightly together than prior to wrapping. This enables more three-packs to fit into a cardboard carton than a single shrink wrapped package.

Figure 19:
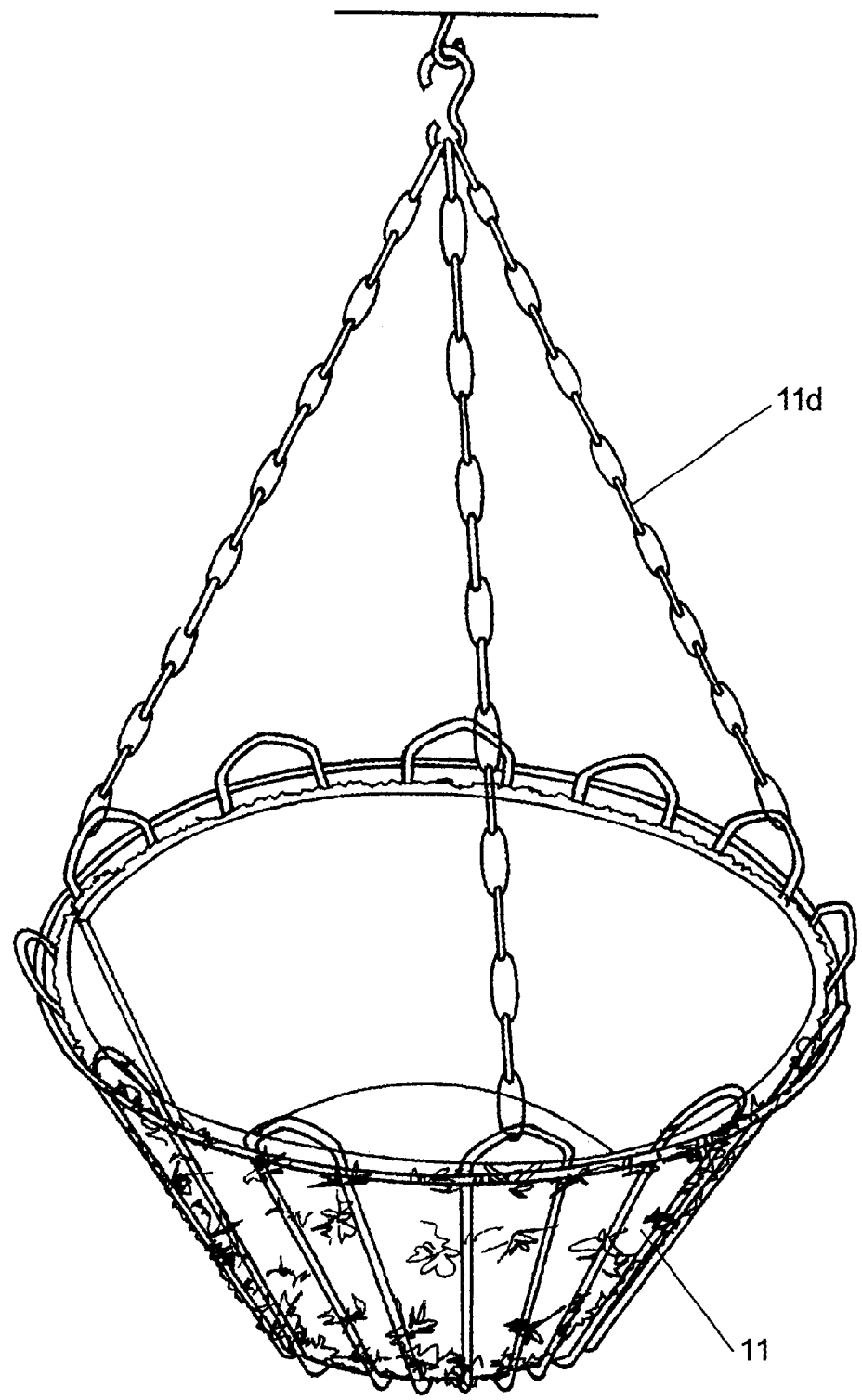
FIG. 19 is a perspective view of the liner of FIG. 16 installed in a conventional hanging basket assembly.

The intended use of the liner is illustrated in FIG. 19. As shown, the liner 11 is inserted into a conventional hanging basket assembly 11d. Once the liner 11 is inserted into the basket, it may be fully reconstituted by having water poured over or by being soaked in water for a matter of minutes, to enable full reconstitution to occur.

It will be appreciated that depending upon the shape of the blank, various liner shapes can be created. Generally, it is desirable that the shape is one which can allow nesting of similar shaped liners. Such nesting configurations are employed where the assembly step is performed at a site remote from the point of sale.

Figure 20:
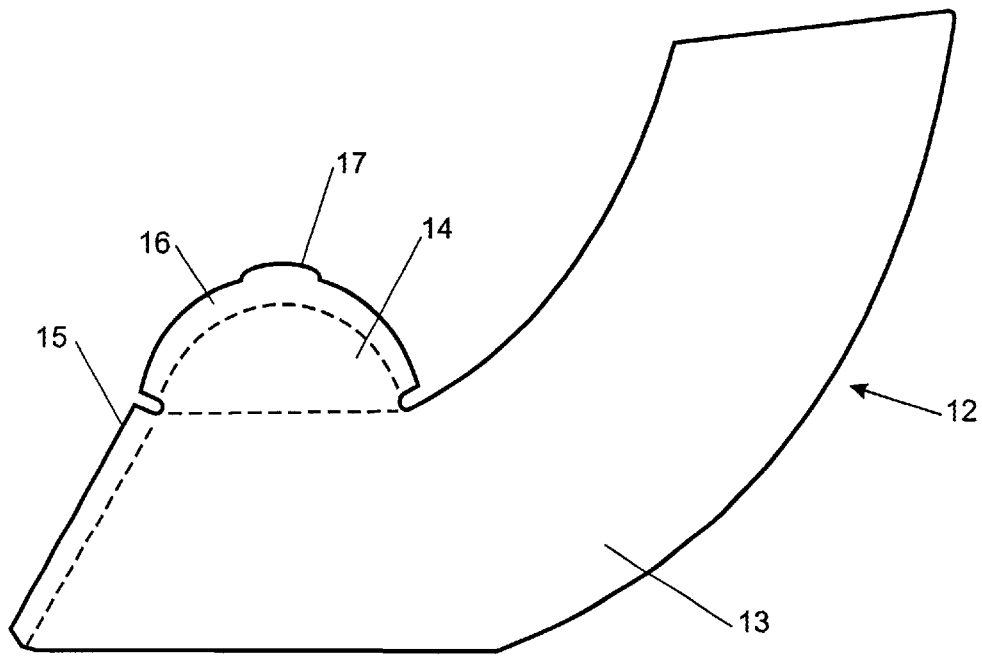
FIG. 20 is a blank of compressed sphagnum moss which may be used to assemble a modified plant container liner.
Figure 21:
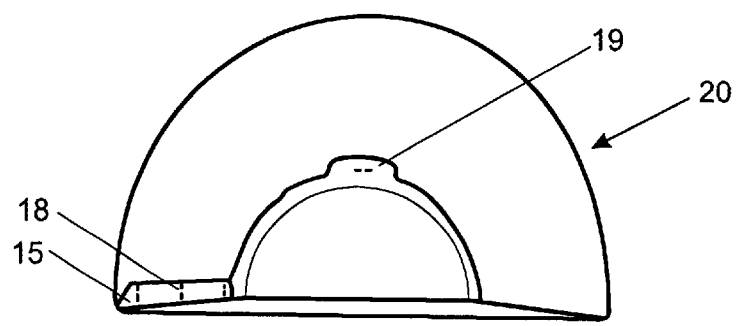
FIG. 21 is a top view of the three dimensional liner formed from the blank illustrated in FIG. 20.
Figure 22:
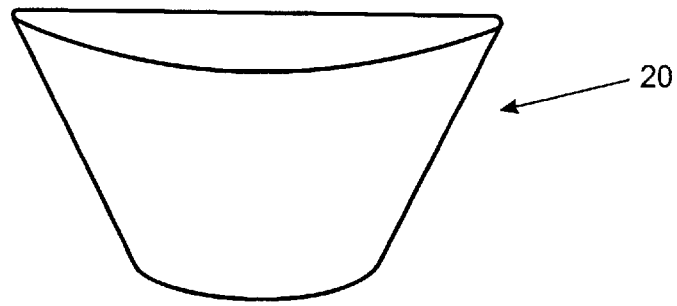
FIG. 22 is a front perspective view of the liner in FIG. 21.

An illustration of one possible modified blank and liner formed therefrom is illustrated in FIGS. 20 to 22 of the accompanying drawings. In FIG. 20 the blank 12 of compressed sphagnum moss is provided with a side wall section 13 and an integral base section 14. The shape is designed to create a three dimensional liner which, when assembled is, suitable for a plant container supported against a surface such as a wall. The overlap section 15 allows the joining ends of the wall section to be connected and the extension section 16 with tab 17 is upturned to join by way of staples 18, 19, the base in a manner similar to that previously described in connection with FIGS. 13 to 15. Optionally, the exterior of the liner 20 is then sprayed with water.

Figure 23:
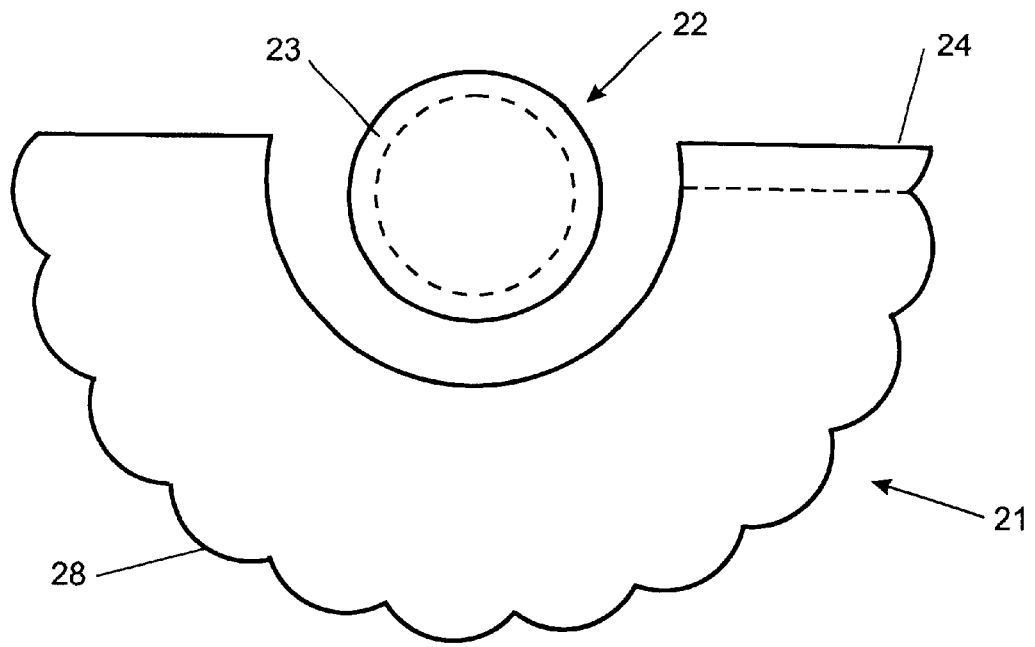
FIG. 23 is a view of a wall blank of compressed sphagnum moss and a separate base blank.
Figure 24:
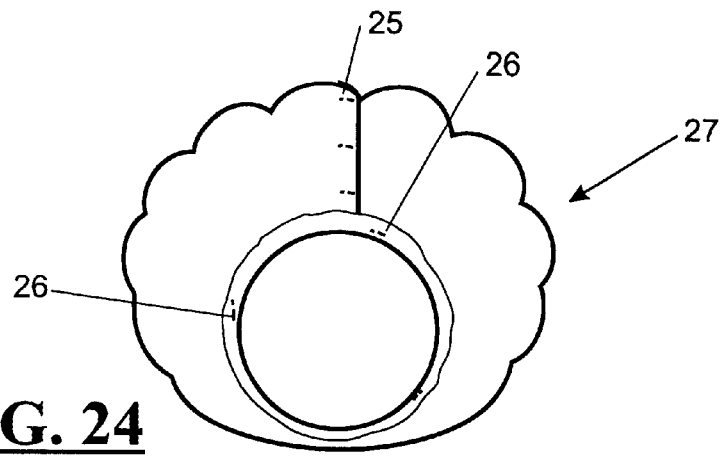
FIG. 24 shows a top view of the three dimensional liner formed from the component parts as illustrated in FIG. 23.
Figure 25:
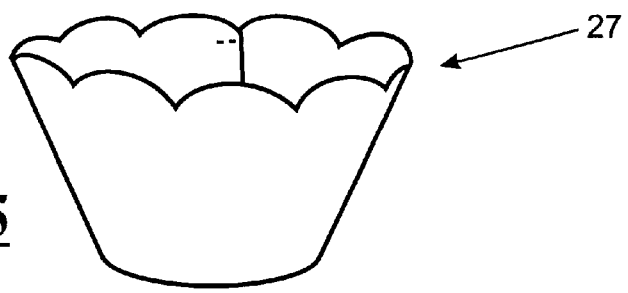
FIG. 25 is a front view of the liner illustrated in FIG. 24.

A further modification of the present invention allowing a liner to be assembled from a base and wall section is illustrated in FIGS. 23 to 25 of the drawings. A wall blank 21 of compressed sphagnum moss is provided together with a separate base member 22 having a lip 23. An overlap section 24 allows for the joining ends of the wall using staples 25. The lip 23 is upturned and then connected to the lower end of the wall with staples 26 thereby completing the three dimensional liner 27 as illustrated in FIGS. 24 and 25. The wall section 21 is shown with a scalloped upper periphery that is also produced as a scalloped finish in the assembled liner 27. Optionally, the exterior of the liner is then sprayed with water to partially reconstitute the outer surface layer.

It will be appreciated from the above description of the method of manufacture that from an outward appearance it is not easy to distinguish between a liner that has been formed to incorporate a water retentive barrier within the compressed sphagnum moss and one which does not have such a barrier. Establishing a distinctive peripheral edge such as the scalloped edge 28 could be used to provide a visual distinction indicating to a user that the liner has a water retentive barrier.

According to another embodiment of the invention, the blank 30 illustrated in FIG. 26 is assembled to form a liner 32 for inserting into a wall mounted hanging basket or container (not shown) of the kind which has a planar semi-circular back section for mounting against a supporting wall surface and a curved front wall section, generally conforming to the surface of a quarter sphere. Such baskets or containers have an open top for insertion of the plant.

The blank 30 is of integral construction, having a back section 34, a first front section 36 and a second front section 38. The back section 34 is substantially semi-circular in shape and is connected to the second front section at a central portion of its curved periphery. On the remainder of its curved periphery on either side of the central connected portion, the back section 34 is provided with overlap sections 40,42. These overlap sections are folded at approximately right angles to the back section 34 to overlap with the rear edges 43,44 of the second front section 38. Optionally, these overlap sections 40,42 could be clipped to assist with joining to the rear edges 43,44 of the second front section 38.

The first and second front sections 36, 38 are shaped so that when assembled together they will approximately conform to the shape of the surface of a quarter sphere. The two divisions between the first and second front sections 36,38 are thus in the manner of darts commonly employed in the construction of garments. At each of the two divisions between the first and second front section 36,38 are overlap sections 46,48. These overlap sections 46, 48 overlap respective adjacent edges of the first front section 36 in the assembled configuration of the liner 32. The overlap sections 46,48 could be clipped to assist the assembly process.

Figure 29:
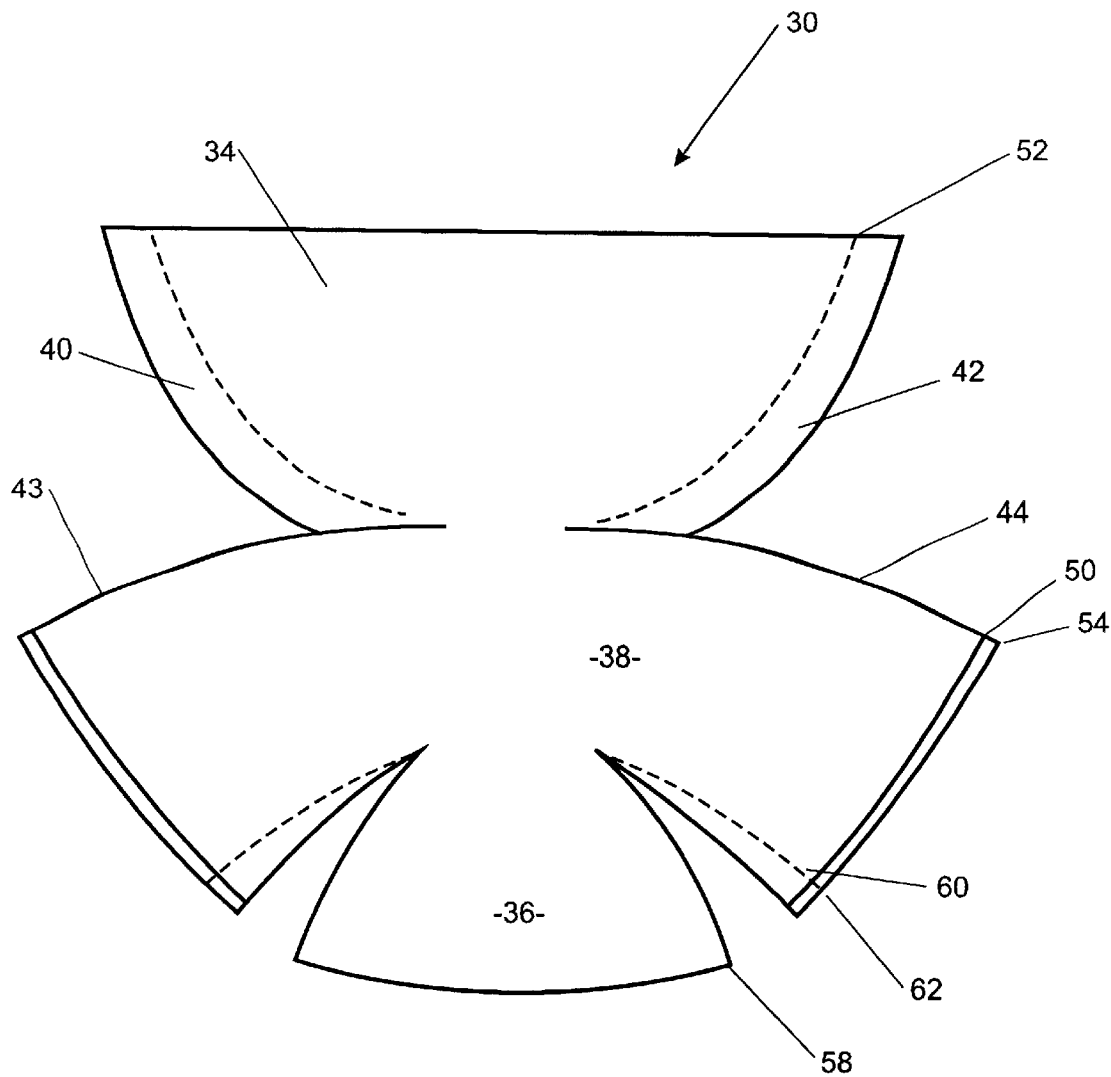
FIG. 29 is a further detailed view of the blank shown in FIG. 26.

FIG. 29 illustrates a further detailed view of the blank of FIG. 26. If the rear edges 43,44 of the second front section 38 were to be curved around to follow the corresponding periphery of the back section 34, as indicated by the phantom lines, then point 50 on the second front section 38 would correspond to point 52 on the back section 34. Instead, the shape of the blank is such that the second front section 38 is extended as shown in FIG. 29 so that point 54 meets with point 52 on the back section. The rear edges 43,44 of the second front section 38 must therefore be gathered or drawn inwards and/or the overlap sections 40,42 stretched to achieve the specified fit. This is required to achieved the desired spherical fullness to the assembled liner. The overlap sections 40,42 are stapled near to the rear edges of the second front section 38.

Similarly, point 58 on the first front section 36 would normally meet with point 60 on the second front section 38. Instead, point 58 meets with point 62. The forward edges of the second front section 38 must therefore be gathered and/or the adjacent edges of the first front section 36 stretched to achieve the required fit and accordingly obtain the desired fullness for the assembled liner 32. The joins are secured by staples.

On assembly, the overlap portions 46,48 of the first front section 36 are joined to the second front section followed by the joining of the back section 34 to the second front section 38. Staples are used to secure the joins and hold the liner in the assembled configuration.

It will be appreciated that the blank illustrated in FIGS. 26 and 29 need not be of integral construction and could be constructed of two or more parts. For example, the back section 34 could be formed as a discrete component of the liner with appropriate joining tabs provided on either the back section on or the second front section. Additionally, the first and second front sections 36,36 could also be discrete.

Once the liner, in whatever form, has been assembled into a three dimensional form, the treatment of the outer section of such a complete liner with moisture to a sufficient degree allowing the reconstitution of the outer section of the sphagnum moss gives an enhanced visual appearance making it easily possible for a prospective customer to recognise the liner as having been formed from sphagnum moss. It is desirable to ensure treatment allows only the required partial reconstitution of the liner and of course this step can be more easily controlled using the form of the invention where there is a water barrier.

What is claimed is:

1. A method of forming a liner for a plant container, the liner being of three dimensional form with a top opening and one or more walls extending in an upstanding configuration towards the opening, the method including: assembling one or more sheets of reconstitutable compressed sphagnum moss into the three dimensional form of the liner; securing the sheet(s) in that form; enclosing the secured assembled liner into a package; partially reconstituting the compressed sphagnum moss into a non-compressed state either before or after the act of assembling but prior to enclosing in the package, the partially reconstituted liner retaining sufficient stiffness to be self-supporting in the upstanding configuration.

2. The method as claimed in claim 1 further including compressing sphagnum moss directly into the form of one or more blanks shaped for assembly into the three dimensional form of the liner.

3. The method as claimed in claim 2 wherein the liner is assembled from a single blank and the sphagnum moss is compressed in a mould having a mould recess defining the shape of the blank.

4. The method as claimed in claim 3 including using a mould loading device to load a predetermined quantity of sphagnum moss into the mould recess prior to compression.

5. The method as claimed in claim 1 further including cutting the or each sheet of compressed sphagnum moss from a larger sheet of compressed sphagnum moss prior to assembly into the three dimensional form of the liner.

6. The method as claimed in claim 1 wherein the or each sheet is secured in the three dimensional form by staples.

7. The method as claimed in claim 1 further including compressing sphagnum moss to form the or each reconstitutable compressed sheet, including drying the moss to between 18 and 20 percent moisture by weight prior to compressing.

8. The method as claimed in claim 1 wherein the act of partially reconstituting comprises at least partially reconstituting the surface of at least a portion of the or each sheet prior to assembly.

9. The method as claimed in claim 3 wherein the act of partially reconstituting comprises at least partially reconstituting the surface of one side of the blank prior to assembling the blank to the three dimensional form.

10. The method as claimed in claim 1 wherein the act of partially reconstituting comprises at least partially reconstituting the surface of at least a portion of the liner following assembly.

11. The method as claimed in claim 10 wherein the surface of the exterior of the liner is at least partially reconstituted.

12. The method as claimed in claim 8 wherein the at least partial reconstitution is achieved by spraying the surface with water.

13. The method as claimed in claim 1 wherein the or each sheet of reconstitutable compressed sphagnum moss includes a water retentive barrier.

14. The method of claim 13 wherein the or each sheet of reconstitutable compressed sphagnum moss is formed by initially placing the water retentive barrier on a bed of sphagnum moss and placing another layer of sphagnum moss onto the water retentive barrier before compressing the sphagnum moss together with the water retentive barrier.

15. The method of claim 14 wherein the water retentive barrier is aluminum foil.

16. The method as claimed in claim 8 wherein the or each sheet of reconstitutable compressed sphagnum moss incorporates a water retentive barrier.

17. The method as claimed in claim 1 wherein the three dimensional form is shaped to facilitate nested stacking of the liners.

18. A method as recited in claim 1, wherein the package is a plastic wrapping.

19. A method of forming a plant container liner, the method comprising:

forming a substantially flat blank comprised of reconstitutable compressed sphagnum moss, the flat blank including one or more discrete components;

assembling the blank into a three dimensional form with a top opening and one or more walls extending in an upstanding configuration towards the opening;

securing portions of the assembled blank together so that the assembled blank is self-supporting in the upstanding configuration;

reconstituting only a portion of the sphagnum moss into a substantially non-compressed state, the act of reconstituting being performed either before or after the act of assembling; and enclosing the secured assembled blank containing the reconstituted sphagnum moss into a package.

20. A method as recited in claim 19, further comprising applying a dryer to the reconstituted sphagnum moss prior to the act of enclosing.

21. A method as recited in claim 19, wherein the act of reconstituting comprises spraying water onto the blank.

22. A method as recited in claim 19, wherein the act of securing comprises stapling the portions of the assembled blank together.

23. A method as recited in claim 19, wherein the act of enclosing comprises enclosing the secured assembled blank in a layer of plastic.

24. A method of forming a plant container liner, the method comprising:

forming a substantially flat blank comprising a central layer of substantially water resistive material having an inner surface and an outer surface, an outer layer of reconstitutable compressed sphagnum moss disposed on the outer surface of the central layer, and an inner layer of reconstitutable compressed sphagnum moss disposed on the inner surface of the central layer;

assembling the blank into a three dimensional form with a top opening and one or more walls extending in an upstanding configuration towards the opening;

securing portions of the assembled blank together so that the assembled blank is self-supporting in the upstanding configuration; and reconstituting only a portion of the sphagnum moss into a substantially non-compressed state, the act of reconstituting being performed either before or after the act of assembling.

25. A method as recited in claim 24, further comprising enclosing the secured assembled blank containing the reconstituted sphagnum moss in a package.

26. A method as recited in claim 25, wherein the act of enclosing comprises shrink wrapping a layer of plastic over the secured assembled blank so that layer of plastic substantially follows the contour of the secured assembled blank.

27. A method as recited in claim 25, further comprising applying a dryer to the reconstituted sphagnum moss prior to the act of enclosing.

28. A method as recited in claim 24, wherein the act of reconstituting comprises spraying water onto the blank.

29. A method as recited in claim 24, wherein the act of securing comprises stapling the portions of the assembled blank together.

30. A method as recited in claim 24, wherein the act of forming the blank comprises the central layer of substantially water resistive material being comprised of aluminum foil.

31. A method as recited in claim 24, wherein the act of forming the blank comprises the blank being formed of one or more discrete components.

32. A method as recited in claim 24, wherein the act of securing comprises the three dimensional form having an interior surface bounding a compartment, the compartment of the secured three dimension form being configured to substantially retain water therein when the inner layer of compressed sphagnum moss is reconstituted into a non-compressed state.

* * * * *